US006560772B1

(12) United States Patent
Slinger

(10) Patent No.: US 6,560,772 B1
(45) Date of Patent: May 6, 2003

(54) METHOD, SYSTEM, AND PROGRAM FOR ACCESSING DATA IN DIFFERENT ENVIRONMENTS

(75) Inventor: Nigel G. Slinger, Los Gatos, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/419,436

(22) Filed: Oct. 15, 1999

(51) Int. Cl.[7] ................................................. G06F 9/44
(52) U.S. Cl. ....................... 717/124; 717/126; 709/227; 709/228; 707/522
(58) Field of Search ............................. 717/11, 10, 124, 717/102, 101, 123, 126, 100; 707/522, 523, 524; 709/201, 227–232, 310, 330, 101

(56) References Cited

U.S. PATENT DOCUMENTS

| | | | | |
|---|---|---|---|---|
| 5,119,377 A | * | 6/1992 | Cobb et al. ..................... | 714/38 |
| 5,265,250 A | * | 11/1993 | Andrade et al. ............ | 709/101 |
| 5,446,900 A | * | 8/1995 | Kimelman ...................... | 714/1 |
| 5,708,828 A | * | 1/1998 | Coleman ..................... | 707/523 |
| 5,794,042 A | * | 8/1998 | Terada et al. ................ | 345/866 |
| 5,806,062 A | * | 9/1998 | Chen et al. ..................... | 707/1 |
| 5,832,274 A | * | 11/1998 | Cutler et al. ................. | 717/171 |
| 5,911,074 A | * | 6/1999 | Leprince et al. ............ | 717/100 |
| 5,930,495 A | * | 7/1999 | Christopher et al. .......... | 703/26 |
| 5,983,012 A | * | 11/1999 | Bianchi et al. ................ | 703/23 |
| 6,006,029 A | * | 12/1999 | Bianchi et al. ................ | 703/24 |
| 6,032,147 A | * | 2/2000 | Williams et al. ................ | 707/1 |
| 6,055,227 A | * | 4/2000 | Lennert et al. ............. | 370/254 |
| 6,085,253 A | * | 7/2000 | Blackwell et al. .......... | 709/235 |
| 6,105,021 A | * | 8/2000 | Berstis ......................... | 707/10 |
| 6,182,279 B1 | * | 1/2001 | Buxton ........................ | 717/100 |
| 6,219,669 B1 | * | 4/2001 | Haff et al. ..................... | 707/10 |
| RE37,258 E | * | 7/2001 | Patel et al. ................. | 358/1.13 |
| 6,324,683 B1 | * | 11/2001 | Fuh et al. .................... | 717/124 |
| 6,327,623 B2 | * | 12/2001 | Watts .......................... | 709/229 |
| 6,442,663 B1 | * | 8/2002 | Sun et al. .................... | 711/202 |

OTHER PUBLICATIONS

Title: File name mapping in a heterogeneous distributed environment, IBM Technical Disclosure Bulletin, Mar. 1990.*
Title: Convert: A high level translation definition language for data conversion, author: Shu et al, ACM, Oct., 1975.*
Title: DB2 Universal Database for OS/390, Utility Guide & Reference vol. 6, IBM, Jun. 1999 pp. 487–493.*
Title: A multiple processor approach to data compression, ACM, Simpson et al, 1998.*
IBM Corp., "DB2 Universal Database for OS/390 Utility Guide and Reference, Version 6", IBM Document No. SC26–9015–00, 1999, Chapter 3–9, pp. 487–494.

* cited by examiner

*Primary Examiner*—Gregory Morse
*Assistant Examiner*—Chameli Das
(74) *Attorney, Agent, or Firm*—David W. Victor; Konrad Raynes Victor & Mann LLP

(57) ABSTRACT

Disclosed is a system, method, and program for making data available to a first application program. A determination is made of an environment in which the first application program is called. Data is accessed in a first format if the determined environment is a first environment. Otherwise, if the determined environment is a second environment, then a second application program is called. The second application program performs accessing data in a second format and storing the accessed data in a storage location. The accessed data in the storage location is accessible to the first application program.

24 Claims, 4 Drawing Sheets

METHOD, SYSTEM, AND PROGRAM FOR ACCESSING DATA IN DIFFERENT ENVIRONMENTS

BACKGROUND OF THE INVENTION

1. Field of the Invention

The present invention relates to a method, system, and program for providing data to an application program from different environments and, in particular, processing the data with at least one routine to make available to the application program.

2. Description of the Related Art

The International Business Machine Corporation's (IBM) interactive problem control system (IPCS) is a tool provided with the IBM MVS operating system to aid in diagnosing software failures. IPCS provides formatting and analysis support for dumps and traces produced by MVS, other program products, and applications that run on MVS.** A dump occurs during an abnormal end of a program (ABEND). If such a system error occurs, data in memory is written to disk storage, i.e., dumped. IPCS is used to format and analyze unformatted dumps. When unformatted dump data sets are submitted, IPCS simulates dynamic address translation (DAT) and other storage management functions to recreate the system environment at the time of the dump. IPCS reads the unformatted dump data and translates it into words. For example, IPCS can identify jobs with error return codes, resource contention in the system, and control block overlays.

To utilize IPCS, a system administrator must enter a series of specialized commands to perform dump and trace analysis, such as analyze, format, view, retrieve, and copy dump and trace data, and to maintain an IPCS session. Details of the IPCS program are described in the IBM publication "OS/390 MVS Interactive Problem Control System (IPCS) User's Guide," IBM document no. GC28-1756-00 (IBM Copyright 1996), which publication is incorporated herein by reference in its entirety.

One problem with IPCS is the difficulty in analyzing the compressed and unformatted dumped data to determine the source of the error. Thus, there is a need in the art to integrate utilities especially useful for presenting formatted and compressed data with programs that provide access to data dumps, such as IPCS.

SUMMARY OF THE PREFERRED EMBODIMENTS

To address the shortcomings in the prior art discussed above, preferred embodiments disclose a method, system, and program for making data available to a first application program. A determination is made of an environment in which the first application program is called. Data is accessed in a first format if the determined environment is a first environment. Otherwise, if the determined environment is a second environment, then a second application program is called. The second application program performs accessing data in a second format and storing the accessed data in a storage location. The accessed data in the storage location is accessible to the first application program.

In further embodiments, the data in the second format is dumped from memory during an abnormal end. In such case, the first application program is capable of decompressing and formatting the dumped data for diagnostic purposes.

In still further embodiments, the second application program comprises at least one get routine to access the data and at least one convert routine to convert the accessed data to another format. In such case, the get routine accesses the data in the second format and the convert routine converts the data to another format before storing the accessed data in the storage location for access by the first application program.

Preferred embodiments provide a programming technique to make data available to a utility program when the utility program would not otherwise have access to the data. With the preferred embodiments, a standard set of routines may be used to interface data from one environment with the utility program that operates in a different environment. With the preferred embodiment technique, dump data can be accessed from an IPCS environment and made available to the DSN1PRNT utility to format and decompress for diagnostic purposes. In this way, the diagnostic features of one program, e.g., DSN1PRNT, can be used to access data, e.g., dump data, that would normally not be accessible to the utility.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

Figure 1:
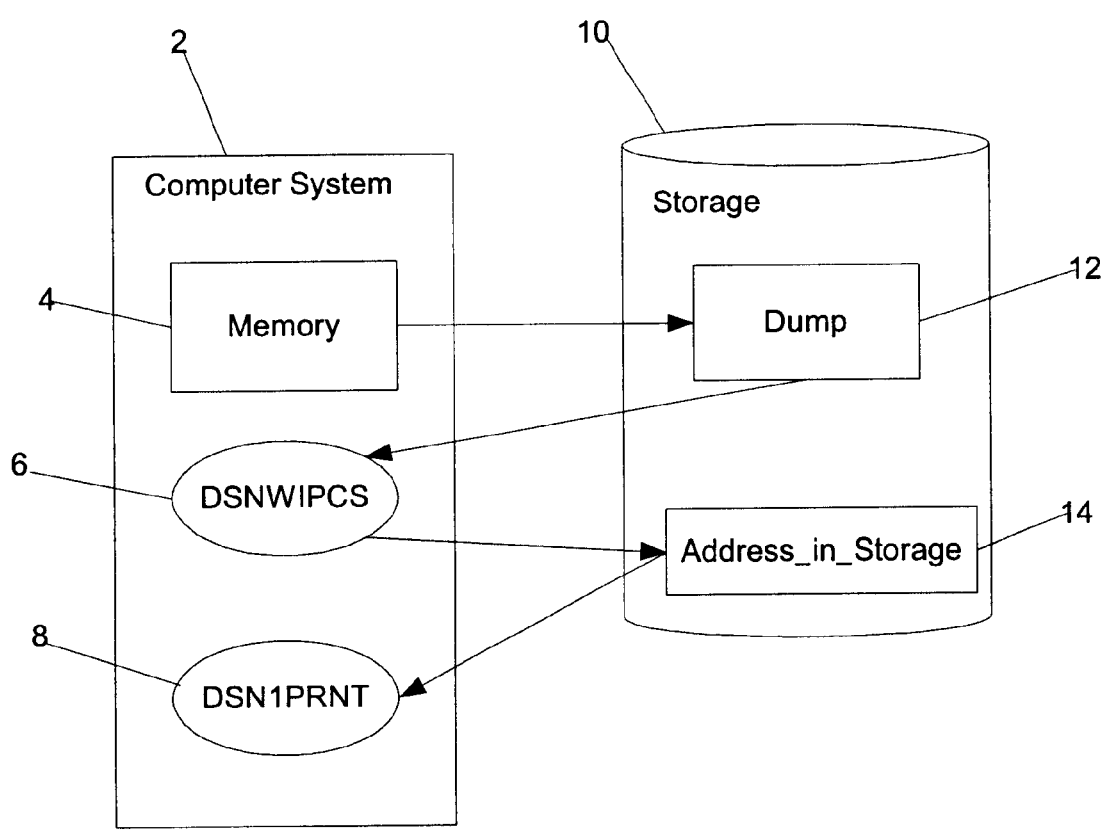
FIG. 1 illustrates a computing environment in which preferred embodiments are implemented.

In the following description, reference is made to the accompanying drawings which form a part hereof, and which illustrate several embodiments of the present invention. It is understood that other embodiments may be utilized and structural and operational changes may be made without departing from the scope of the present invention.

The IBM DSN1PRNT utility is used to print data records in table spaces and index spaces from database programs such as DB2.** DSN1PRNT formats the data and indexes for any page that does not contain an error that would prevent formatting. If DSN1PRNT detects an error, it prints an error message just before the page where the error occurred. Formatting resumes with the next page. Thus, DSN1PRINT is useful for examining data and determining the point within a page where the error occurred. DSN1PRNT also decompresses compressed data before printing. The decompression and formatting of the data makes it substantially easier for a database administrator to analyze. The formatting features of DSN1PRNT are especially useful for reviewing data to place in a readable format and diagnose the source of errors. Details of DSN1PRNT are further described in the IBM publication "DB2 Universal Database for OS/390: IBM Utility Guide and Reference, Version 6", IBM publication no. SC26-9015-00 (Copyright IBM, June 1999), which publication is incorporated herein by reference in its entirety.

Currently, DSN1PRNT operates on DB2 VSAM data sets, image copy data sets and sequential data sets that all contain tablespaces or indexspaces. Preferred embodiments provide a method, system, and program to interface data from an IPCS dump to the DSN1PRNT utility to utilize all the functions and operations provided by DSN1PRNT for data analysis of a dump dataset. For instance, by providing IPCS dump data to the DSN1PRNT utility, the dumped data may be formatted and decompressed to present to the system administrator in a readable and understandable format that is much simpler to diagnose.

To interface IPCS dump data with the DSN1PRNT utility, preferred embodiments provide a subroutine structure which is called along with DSN1PRNT. Preferred embodiments further include a dynamic method for compiling the diagnostic program including the subroutines in an efficient manner. DSN1PRNT first detects that it is called in a IPCS dump environment, as opposed to a database pageset environment. Upon detecting that it is operating in the IPCS environment, a call is made to a subroutine DSNWIPCS for which the user has defined parameters. DSNWIPCS is comprised of a plurality of subroutines that operate on the passed parameters. DSNWIPCS parameters may be passed by the user or obtained from the IPCS environment and control blocks. The following subroutines are included with the utility to interface DSN1PRNT with dump data based on the parameters:

IPCSGET—this subroutine is used to access a dump data set and includes the following parameters:
  1. condition_code (optional): a four byte field used to check whether or not to run the rest of the routine. If the value is non-zero than the remaining utility subroutines requiring a valid condition_code are skipped; otherwise, if the value is zero, the next subroutine requiring the condition_code is called.
  2. Address_in_dump: is the address of the IPCS dump data set.
  3. Address_in_storage: is the address where the dataset from the dump will be returned.
  4. Block_length: is the length of the block requested, by default it is 4K.
  5. Validation: a 16 bit hex code that is used if the dump dataset is a control block to check whether the first two bytes of the control block, which identify the control block, are of a certain specified type.
  6. Return_code: a 4 byte filed used to indicate whether validation succeeded or failed.
  7. Message: if a message is specified, then the message will provide information on an unsuccessful attempt to access a dump dataset.
  8. block_eye_catcher: a field to include in the message if the validation is unsuccessful.
CONVERT_TO_HEX: this subroutine converts data accessed from the address_in_dump to printable EBCDIC parameters. EBCDIC is a binary code for alphabetic and numeric characters that IBM developed for its larger operating systems. It is the code for text files that is used in IBM's OS/390 operating system for its S/390 servers and that thousands of corporations use for their legacy applications and databases. In an EBCDIC file, each alphabetic or numeric character is represented with an 8-bit binary number (a string of eight 0's or 1's). 256 possible characters (letters of the alphabet, numerals, and special characters) are defined. This subroutine uses the following parameters:
  1. condition_code (OPTIONAL) same use as described above.
  2. Hex_name is the address of a string of hex bytes to convert to printable EBCDIC.
  3. Hex_length: is the length of the string of bytes to convert.
  4. Print_offset: is the offset in the IPCS print buffer where the converted HEX is to be placed.
  5. Print_now: when set to Y forces the print buffer to be externalized after the conversion occurs.
CONVERT_TO_DECIMAL is a subroutine that converts hex data to decimal.
  1. Condition_code: used in manner described above:
  2. decimal_name is the address of a string of hex bytes to convert to decimal, e.g., 0000000A=10.
  3. decimal_length: is the length of the decimal field.
  4. Print_offset: is the offset in the IPCS print buffer where the converted HEX is to be placed.
  5. Print_now: when set to Y forces the print buffer to be externalized after the conversion occurs.
CONVERT_TO_KB is a subroutine used to convert bytes to kilobytes, e.g., 1024=1K. This subroutine includes the condition_code parameter and KB_name which is the name of a field to be divided by 1024.
IPCSOUT is a subroutine that externalizes the print buffer to IPCS. This subroutine includes the condition_code parameter and a buffer_out dummy parameter which allows the compiler to choose IPCSOUT when invoked.
TEXTOUT is a subroutine that outputs plain text without any conversion. This subroutine uses the following parameters:
  1. condition_code (OPTIONAL) same use as described above.
  2. Text_name is the a string of bytes to be printed.
  3. text_length: is the length of the string of bytes.
  4. Print_offset: is the offset in the IPCS print buffer where the converted HEX is to be placed.
  5. Print_now: when set to Y forces the print buffer to be externalized after the conversion occurs.

In preferred embodiments, a user at a terminal to a computer including an operating system, such as the IBM OS/390, would invoke the above subroutines by writing a program including a call to the DSN1PRNT utility and the DSNWIPCS utility including the parameters needed to trigger the particular subroutines. Depending on the parameters used, the DSNWIPCS program would determine the appropriate entry point for the above subroutines. For instance, if the user wanted to run the IPCSOUT, convert_to_decimal and other subroutines then the non-optional parameters for such subroutines would have to be provided. In this way, the DSNWIPCS utility includes an overloading of methods, of which particular methods are selected depending on the provided parameters. When the compiler is translating source code to object code, the compiler processes the call to the DSNWIPCS utility to determine which particular subroutines, e.g., IPCSOUT, Convert_to_hex, IPCSGET, etc., to run based on parameters provided with the call or obtained from the environment. To the database administrator invoking the DSNWIPCS utility, the utility appears as a single program requiring parameters. In this way, the administrator provides parameters and the compiler uses the parameters to determine the entry points into the DSNWIPCS utility. The compiler accesses a file including all the DSNWIPCS utility subroutines to access a particular subroutine specified by the provided parameters. For instance, to get the dump data and store in the address_in_storage location which the DSN1PRNT utility can access, the user may call the DSNWIPCS command with the following parameters:

```
DSNWIPCS (address_in_dump:=CTBMP,
    Address_in_storage:=xBRAPTER,
    Block_length:=Length(BBRA),
    Asid_of_block:=Length BBRI,
    Return_code:=Retcd,
    Validation:=BBraidCD,
    Message:='y',
    Condition_code:=Retcd,
    Block_eye_catcher:='BBRA')
```

In another example, to additionally specify parameters for the TEXTOUTPUT subroutine, the user would call the DSNWIPCS command with the following parameters:

```
DSNWIPCS (text:='BBRA: RICT',
    text length:=10,
    print_offset:=5)
```

FIG. 1 illustrates a computing environment in which preferred embodiments may be implemented. A computer system 2, which operates under an operating system such as the IBM OS/390** operating system, includes a volatile memory 4, e.g., RAM, DRAM, etc., and a DSNWIPCS utility 6 as described above to access and convert dump data for use by the DSN1PRNT utility 8. The computer system 2 accesses a storage 10. In the event of an abnormal end (ABEND), data is dumped from the memory 4 to a dump area 12 in the storage 10. If the system administrator wants to utilize the DSN1PRNT utility 8 to access datasets in the dump area 12, then the system administrator would invoke the DSNWIPCS 6 utility to access and perform any conversions on the dump datasets and store at the address_in_storage 14 area in the storage 10. The DSN1PRNT could then access the dump datasets from the address_in_storage 14 location and apply known DSN1PRNT utility functions to format and/or decompress the dump datasets. Preferred embodiments provide methods to access datasets in an environment, e.g., IPCS dumps, that are normally not accessible to the DSN1PRNT utility.

Figure 2A:
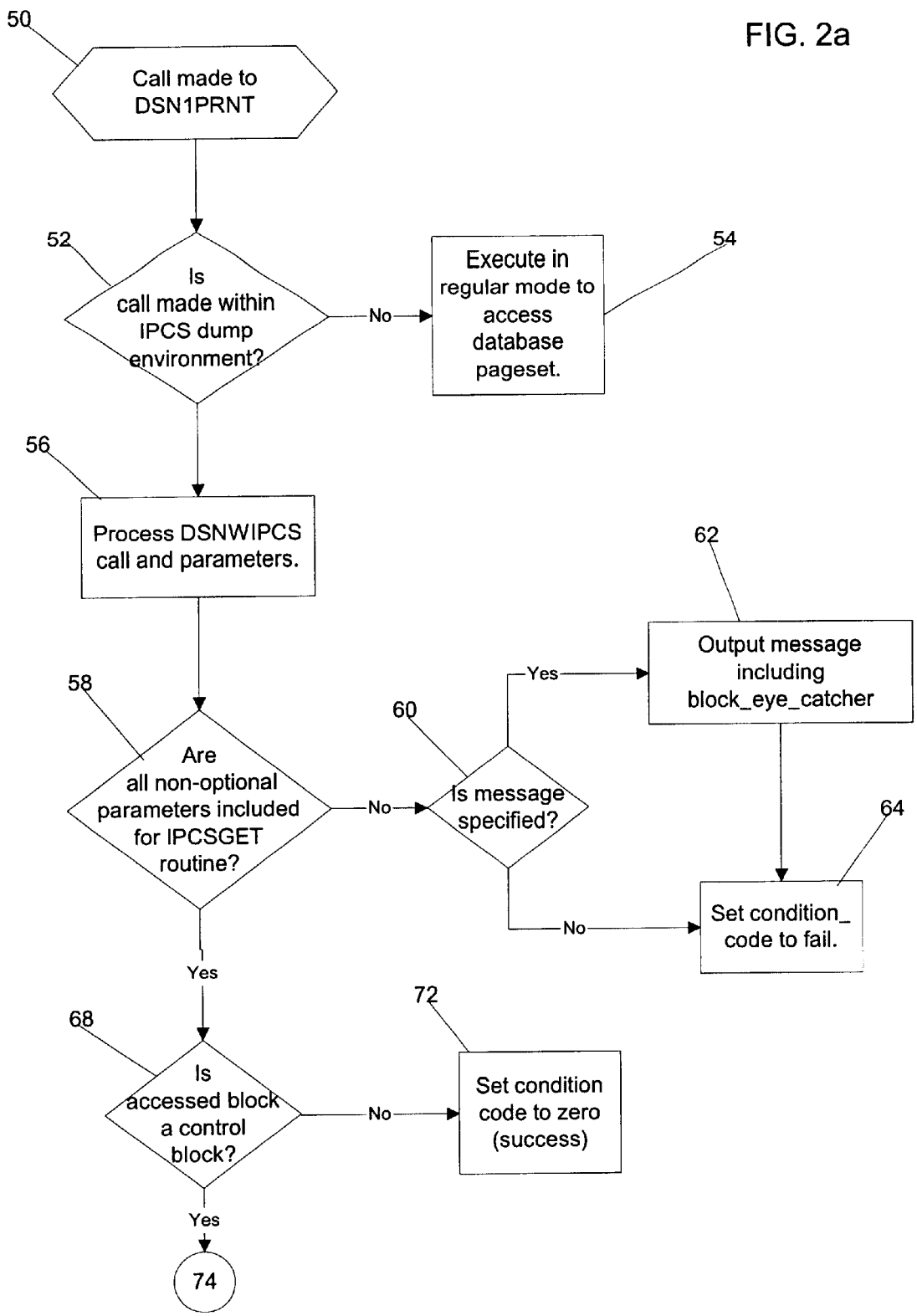
FIGS. 2a and 2b illustrate logic to access dump datasets for use with the diagnostic utility in accordance with preferred embodiments.

FIG. 2a illustrates logic implemented in the DSN1PRNT 8 and DSNWIPCS 6 routines to make the dump datasets available to the DSN1PRNT 8 utility. Control begins at block 50 with a call to DSN1PRNT 8. DSN1PRNT 8 determines (at block 52) whether it is being called within a dump, e.g., IPCS, environment. If not, then DSN1PRNT 8 executes (at block 54) in regular mode to access a database pageset in a manner known in the art. Otherwise, if the DSN1PRNT 8 is called within an IPCS dump environment, then it calls (at block 56) the DSNWIPCS 6 routine to access the dump data. Next, the DSNWIPCS 6 routine determines (at block 58) whether the parameters provided to DSNWIPCS 6 include all non-optional parameters for the IPCSGET routine in the correct format. If all the correct non-optional parameters are not provided, then DSNWIPCS determines (at block 60) whether a message is specified, e.g., the Message parameter is "Y". If so, then DSNWIPCS 6 outputs (at block 62) a message including the block_eye_catcher code, if specified. If a message is not specified, e.g., Message="N" or after outputting the message at block 62, control transfers to block 64 to set the condition_code to fail. Setting the condition_code to fail may propagate this fail code down to other subroutines within the DSNWIPCS utility that include the optional condition_code to block their execution.

Figure 2B:
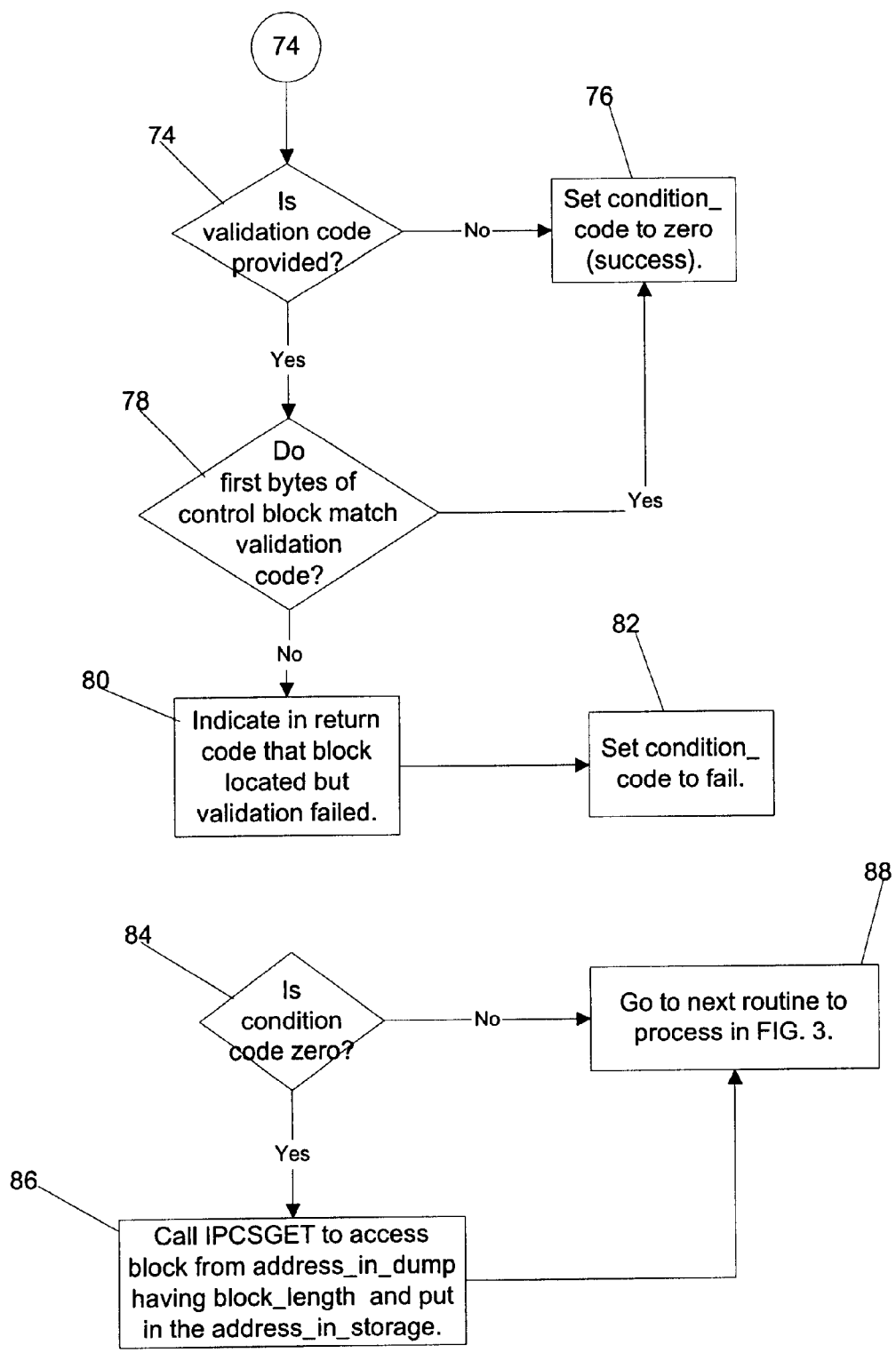

If all non-optional parameters are provided, then IPCSGET is called and determines whether the address_in_dump 12 includes a control block (at block 68). If not, then the data in the address_in_dump includes user data and IPCSGET sets (at block 72) the condition_code to zero or success. This condition_code would propagate down to the next subroutine requiring a condition_code to signal such next subroutine to execute as the previous condition, i.e., getting the IPCS data, succeeded. With respect to FIG. 2b, if, at block 68, the accessed block is a control block, then a determination is made (at block 74) if a validation code is provided. If not, then the IPCSGET routine sets (at block 76) the condition_code to success as the control block does not need to be validated. Otherwise, if a validation code is provided, then the IPCSGET routine determines (at block 78) whether the first bytes of the control block, which comprise the block_id of the control block, match the validation code specifying the correct type of control block. When running DSNWIPCS 6 after DSN1PRNT, the validation code would not be checked as DSN1PRNT involves user data. If the validation code matches, then the condition_code is set (at block 76) to success (zero). Otherwise, indication is made (at block 80) in the return code that the control block was located but validation failed. Then, the condition_code is set (at block 82) to prevent the execution of any further routines requiring the condition_code.

Figure 3:
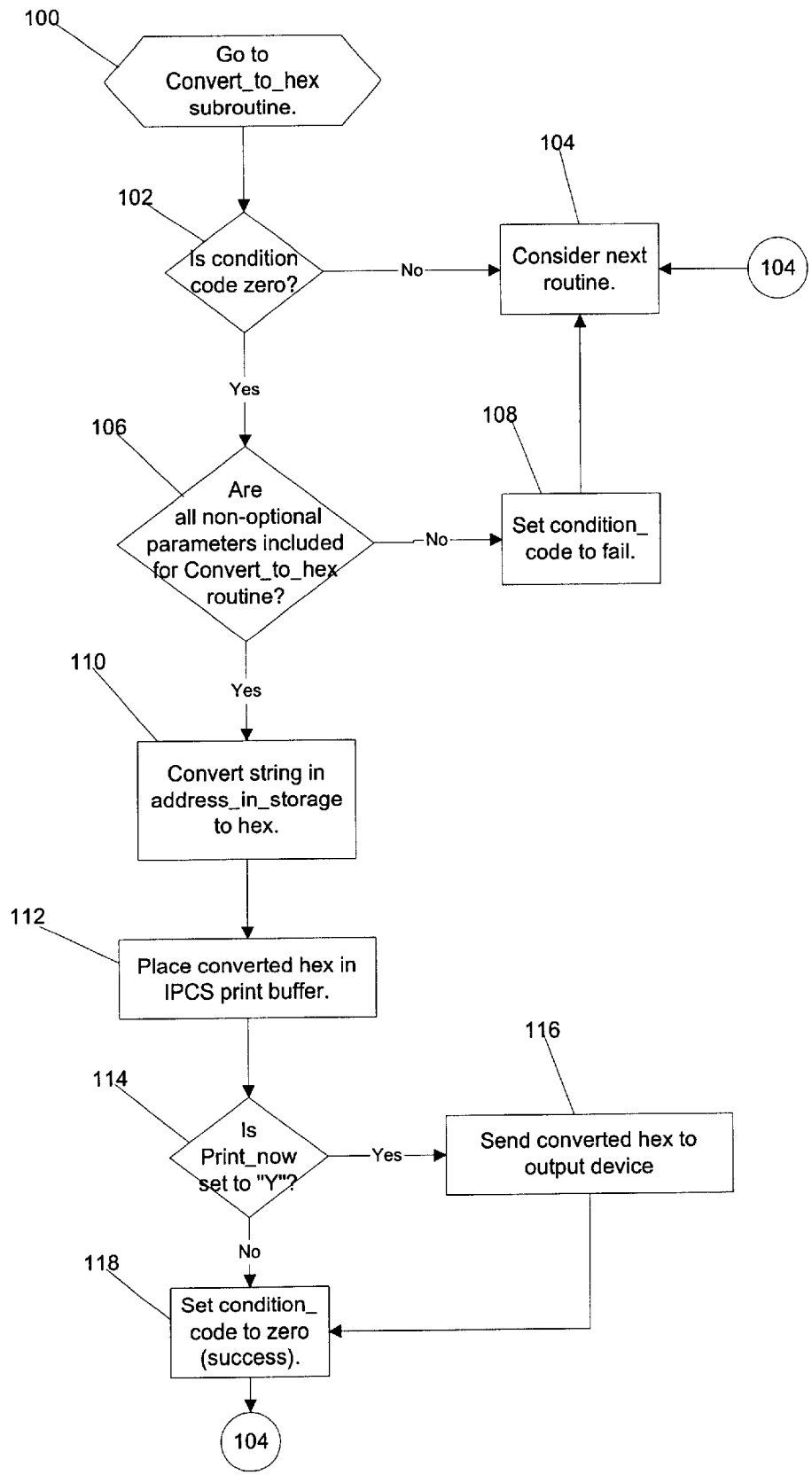
FIG. 3 illustrates logic to convert data in accordance with the preferred embodiments.

If the condition_code is zero, i.e., successful, then IPCSGET 6 accesses (at block 86) the block from the address_in_dump 12 location having the specified or default block_length and stores the accessed block in the address_in_storage 14 location. If the condition_code is non-zero, indicating failure, or after accessing the data, control proceeds to the next routine in FIG. 3 to determine if the administrator included sufficient parameters to convert strings to hexadecimal format. Control begins at block 100 with the DSNWIPCS 6 routine proceeding to process the Convert_to_hex routine. If the condition_code is not zero, then the DSNWIPCS would proceed (at block 104) to the Convert_to_hex routine. As discussed, a condition_code of non-zero could propagate down to prevent other DSNWIPCS routines including the condition_code from executing. If the condition_code is zero, indicating that IPCSGET successfully accessed a dump block, then the DSNWIPCS 6 determines (at block 106) whether all non-optional parameters for the Convert_to_hex are included with the DSNWIPCS parameters. If not, then the condition_code is set (at block 108) to fail or to a non-zero value and control proceeds to block 104 to the next DSNWIPCS 6 routine.

If all parameters are included, then the Convert_to_hex routine converts (at block 110) the string in the address_in_storage data to hexidecimal data. The converted data is placed (at block 112) in the IPCS print buffer. If the Print_now parameter indicates "Y" (yes) (at block 114), then the converted hex data is sent (at block 116) to an output device. Otherwise, the condition_code is set (at block 118) to zero or success and then control proceeds to block 104 to consider any other routines.

The other convert routines, such as convert_to_KB and convert_to_decimal would operate in a similar manner to convert the data accessed from the dump 12 to another format before being placed in the address_in_storage 14 for access by the DSN1PRNT 8 utility.

With preferred embodiments, routines within a utility are selected for execution depending on provided parameters and whether a condition_code is provided. The condition_code predicates the execution of the routine on the outcome of a previously executed routine. In this way, data may be accessed from an environment, such as an IPCS dump, that is otherwise not accessible to DSN1PRNT facilities and placed in a location that DSN1PRNT may access and process using the DSN1PRNT functions. The DSN1PRNT can then be used to format, decompress and otherwise present the dump datasets to the system administrator in a format that is more readily understandable than present techniques for outputting dump data sets. This is especially useful if the dumped data is compressed. With preferred embodiments, the DSN1PRNT can be used to decompress the dumped data and determine the point at which the data is no longer readable or where errors occur.

If the dumped data is in a readable format, then the administrator may specify parameters for the TEXTOUT routine to output the data. Note, that in preferred embodiments, the condition_code is an optional parameter. Thus, if the administrator does not want one particular DSNWIPCS routine to be dependent on the outcome of a previously executed routine, then the no condition_code would be provided for that routine. In such case, if the condition_code parameter is not included, then the routine would execute if the administrator provided valid parameters in the initial call to the DSNWIPCS routine.

The routines of the preferred embodiments redirect dumped data to the DSN1PRNT utility, which usually obtains data in the form of database pagesets in the storage device, not datasets that were dumped into storage as the result of an abnormal ending to processing.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc. Of course, those skilled in the art will recognize many modifications may be made to this configuration without departing from the scope of the present invention.

Preferred embodiments were described with respect to obtaining data from a particular environment, e.g., IPCS, for use by a particular utility program, e.g., DSN1PRNT that is capable of decompressing and formatting data into a readable form particularly suited for diagnostic purposes. In alternative embodiments, the routine may be used to redirect other types of data to other types of utility programs when it would be useful to have such utility programs process that type of data.

In summary, the present invention provides a system, method, and program for making data available to a first application program. A determination is made of an environment in which the first application program is called. Data is accessed in a first format if the determined environment is a first environment. Otherwise, if the determined environment is a second environment, then a second application program is called. The second application program performs accessing data in a second format and storing the accessed data in a storage location. The accessed data in the storage location is accessible to the first application program.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. **MVS, DB2, and OS/390 are registered trademarks of International Business Machines Corporation;

What is claimed is:

1. A method for making data available to a first application program, comprising:
    determining; with the first application program, an environment in which the first application program is called;
    accessing, with the first application program, data in a first format if the determined environment is a first environment;
    calling, with the first application program, a second application program if the determined environment is a second environment, wherein the second application program performs:
        (i) accessing data in a second format; and
        (ii) storing the accessed data in a storage location, wherein the accessed data in the storage location is accessible to the first application program.

2. The method of claim 1, wherein the data in the second format is dumped from memory during an abnormal end.

3. The method of claim 2, wherein the first application program is capable of decompressing and formatting the dumped data for diagnostic purposes.

4. The method of claim 1, wherein the data in the first format is a pageset in a database, wherein the first application program is capable of decompressing and formatting the pageset for diagnostic purposes.

5. The method of claim 1, wherein the second application program comprises at least one get routine to access the data and at least one convert routine to convert the accessed data to another format, wherein the get routine accesses the data in the second format and wherein the convert routine converts the data to another format before storing the accessed data in the storage location for access by the first application program.

6. The method of claim 5, further comprising:
    determining whether sufficient parameters were specified for the get routine;
    executing the get routine to access the data if sufficient parameters were specified;
    determining whether sufficient parameters were specified for the convert routine; and
    executing the convert routine if sufficient parameters were specified.

7. The method of claim 5, further comprising setting a condition code to a value if the get routine accessed the data, wherein the convert routine only executes if the condition code is set to the value.

8. The method of claim 7, wherein further routines perform additional data processing operations, wherein at least one of the further routines only executes if the condition code is set to the value.

9. A system for making data available to a first application program, comprising:
- means, performed by the first application program, for determining an environment in which the first application program is called;
- means, performed by the first application program, for accessing data in a first format if the determined environment is a first environment;
- means, performed by the first application program, for calling a second application program if the determined environment is a second environment, wherein the second application program includes:
  (i) means for accessing data in a second format; and
  (ii) means for storing the accessed data in a storage location, wherein the accessed data in the storage location is accessible to the first application program.

10. The system of claim 9, wherein the data in the second format is dumped from memory during an abnormal end.

11. The system of claim 10, wherein the first application program includes means for decompressing and formatting the dumped data for diagnostic purposes.

12. The system of claim 9, wherein the data in the first format is a pageset in a database, wherein the first application program includes means for decompressing and formatting the pageset for diagnostic purposes.

13. The system of claim 9, wherein the second application program further includes means for accessing the data and means for converting the accessed data to another format, wherein the second application program accesses the data in the second format and converts the data to another format before storing the accessed data in the storage location for access by the first application program.

14. The system of claim 13, further comprising:
- means for determining whether sufficient parameters were specified for the get routine;
- means for executing the get routine to access the data if sufficient parameters were specified;
- means for determining whether sufficient parameters were specified for the convert routine; and
- means for executing the convert routine if sufficient parameters were specified.

15. The system of claim 13, further comprising means for setting a condition code to a value if the get routine accessed the data, wherein the data is converted if the condition code is set to the value.

16. The system of claim 15, further including routine means for performing additional data processing operations, wherein at least one of the further routine means only executes if the condition code is set to the value.

17. An article of manufacture for use in programming a computer to make data available to a first application program, the article of manufacture comprising computer useable media including at least the first application program and a second application program embedded therein that is capable of causing the computer to perform:
- determining, with the first application program, an environment in which the first application program is called;
- accessing, with the first application program, data in a first format if the determined environment is a first environment;
- calling, with the first application program, the second application program if the determined environment is a second environment, wherein the second application program performs:
  (i) accessing data in a second format; and
  (ii) storing the accessed data in a storage location, wherein the accessed data in the storage location is accessible to the first application program.

18. The article of manufacture of claim 17, wherein the data in the second format is dumped from memory during an abnormal end.

19. The article of manufacture of claim 18, wherein the first application program is further capable of causing the computer to perform decompressing and formatting the dumped data for diagnostic purposes.

20. The article of manufacture of claim 17, wherein the data in the first format is a pageset in a database, wherein the first application program is capable of causing the computer to decompress and format the pageset for diagnostic purposes.

21. The article of manufacture of claim 17, wherein the second application program comprises at least one get routine to access the data and at least one convert routine to convert the accessed data to another format, wherein the get routine accesses the data in the second format and wherein the convert routine converts the data to another format before storing the accessed data in the storage location for access by the first application program.

22. The article of manufacture of claim 21, further comprising:
- determining whether sufficient parameters were specified for the get routine;
- executing the get routine to access the data if sufficient parameters were specified;
- determining whether sufficient parameters were specified for the convert routine; and
- executing the convert routine if sufficient parameters were specified.

23. The article of manufacture of claim 21, further comprising setting a condition code to a value if the get routine accessed the data, wherein the convert routine only executes if the condition code is set to the value.

24. The article of manufacture of claim 23, wherein further routines perform additional data processing operations, wherein at least one of the further routines only executes if the condition code is set to the value.

* * * * *

UNITED STATES PATENT AND TRADEMARK OFFICE
CERTIFICATE OF CORRECTION

PATENT NO. : 6,560,772 B1 Page 1 of 1
DATED : May 6, 2003
INVENTOR(S) : Slinger

It is certified that error appears in the above-identified patent and that said Letters Patent is hereby corrected as shown below:

Title page,
Item [56], References Cited, U.S. PATENT DOCUMENTS, add:
-- 4,687,353   08/1987        DeGeorge et al.
   5,504,898   04/1996        Klein
   5,803,623   09/1998        Iwasaki
   5,835,763   11/1998        Klein
   5,850,504   12/1998        Cooper et al.
   5,872,970   02/1999        Pickett et al.
   5,930,795   07/1999        Chen et al.
   2201254     09/27/1998     Canada
   0586767     03/16/1994     EPO --.
OTHER PUBLICATIONS, add:
-- IBM Technical Disclosure Bulletin, "Address Space Suballocation in a Virtual Storage Environment", Vol. 16, No. 6, Nov. 1973, pp. 1877-1881
IBM Technical Disclosure Bulletin, "Dynamic Trouble Reporting Procedure", Vol. 25, No. 5, Oct. 1982, pp. 2442-2443
IBM Technical Disclosure Bulletin, "Run Time Memory Management Algorithm/ Supervisor and WatchDog Support Program", Vol. 39, No. 4, April 1996 pp. 265-268. --.

Signed and Sealed this

Ninth Day of May, 2006

JON W. DUDAS
*Director of the United States Patent and Trademark Office*